United States Patent

Presley et al.

[11] 3,972,543
[45] Aug. 3, 1976

[54] COMBINATION VEHICLE YAW STABILIZER

[75] Inventors: Rex Wallace Presley, Livonia; Walter Frederick Datwyler, Jr., Royal Oak; Jack Richardson Lorraine, Howell, all of Mich.

[73] Assignee: The Bendix Corporation, South Bend, Ind.

[22] Filed: Dec. 6, 1974

[21] Appl. No.: 530,331

[52] U.S. Cl. ................ 280/446 B; 180/103 BF; 188/3 R; 188/112; 303/20
[51] Int. Cl.² ............................................ B60T 7/20
[58] Field of Search ............. 280/446 B; 180/103; 188/3 R, 112; 303/20, 7; 200/61.52

[56] References Cited
UNITED STATES PATENTS

| | | |
|---|---|---|
| 2,856,036 | 10/1958 | Mullen ............... 188/112 |
| 3,288,240 | 11/1966 | Franzel ............... 180/103 |
| 3,566,987 | 3/1971 | Franzel ............... 180/103 |
| 3,810,521 | 5/1974 | Sparr ............... 180/103 |

*Primary Examiner*—M. H. Wood, Jr.
*Assistant Examiner*—John A. Pekar
*Attorney, Agent, or Firm*—Leo H. McCormick, Jr.; S. H. Hartz

[57] ABSTRACT

Apparatus for automatically eliminating a sway condition of a trailer towed by a tow vehicle. A hitch connects the trailer to the tow vehicle and has a sensor for providing signals corresponding to the hitch lateral force for operating the trailer brakes.

3 Claims, 4 Drawing Figures

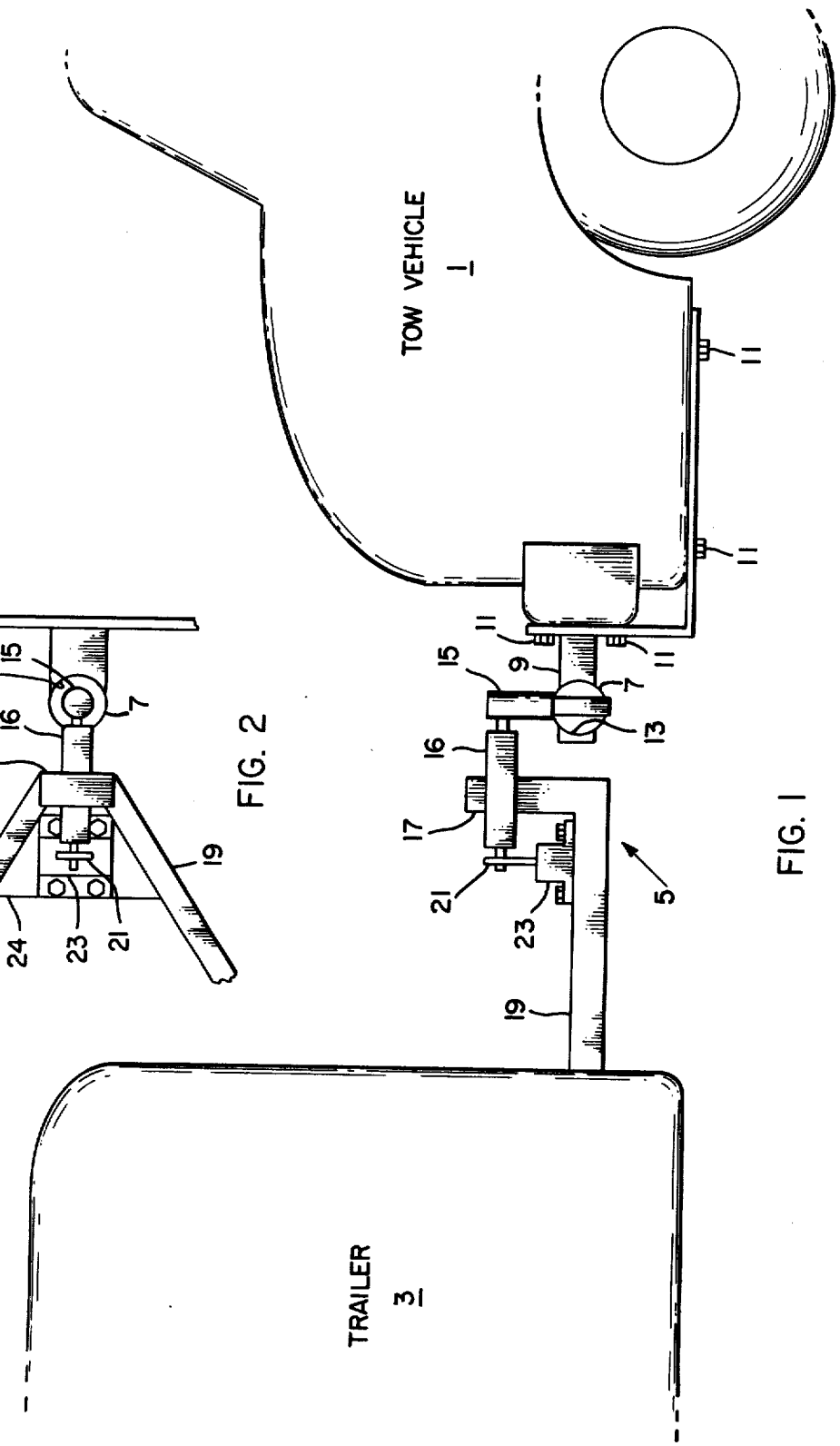

COMBINATION VEHICLE YAW STABILIZER

The invention relates to automatically stabilizing towed vehicles to avoid their inherent tendency to sway or swerve when travelling at moderate or high speeds.

BACKGROUND OF THE INVENTION

It is well recognized that when a towed vehicle, such as a travel trailer, is towed behind a car or truck there is an inherent tendency to sway when travelling at moderate or high speeds, thus causing a hazardous or dangerous driving condition. This condition may be aggravated by travelling over uneven roadbeds, making sudden turns, encountering gusty winds and passing large vehicles, such as trucks, travelling at high speeds.

PRIOR ART

It is well known that applying the brakes of the towed vehicle will correct swaying of the towed vehicle and that the sooner corrective action takes place the greater the chance of avoiding a hazardous or dangerous condition. The time lag before applying the brakes is very critical because the first few moments of any swaying action of the trailer is extremely important in determining the total extent and magnitude of the sway condition.

In some arrangements the lateral acceleration of the trailer is detected and the brakes are applied when the lateral acceleration exceeds a predetermined magnitude. However, there is a serious delay in applying the trailer brakes and the swaying action of the trailer may assume dangerous proportions before corrective action is taken.

SUMMARY OF THE INVENTION

The present invention is directed to sensing hitch lateral force and providing signals corresponding thereto. When the signals attain a predetermined value one or both of the trailer wheels are braked automatically. Hitch lateral force reaches a substantial value before any other parameter, such as lateral acceleration. When the brakes respond to hitch lateral force the brakes are applied before the swerving condition assumes dangerous proportions.

The invention contemplates apparatus for automatically eliminating a sway condition in a trailer vehicle towed by a tow vehicle and having brakes for retarding its rate of movement, comprising a hitch connecting the trailer vehicle to the tow vehicle, sensing means on the hitch for providing signals corresponding to hitch lateral forces, and means connected to the sensing means and responsive to the signals therefrom for operating the trailer vehicle brakes for automatically eliminating a sway condition in the trailer vehicle.

DRAWINGS

FIG. 1 is an elevation of a hitch constructed according to the invention coupling a trailer to a towing vehicle, FIG. 2 is a plan view of the hitch, and FIGS. 3 and 4 are electrical diagrams showing circuits constructed according to the invention for operating the electrical brakes on the trailer in response to hitch lateral force.

DETAILED DESCRIPTION OF THE INVENTION

Figure 3:
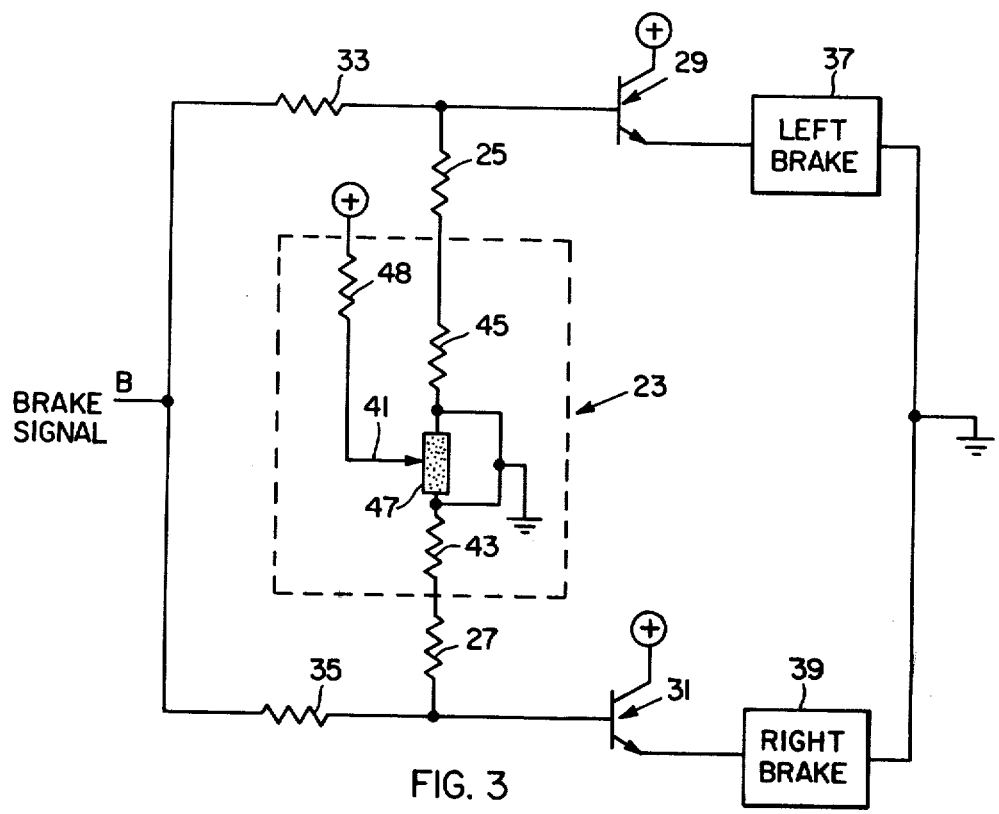

Referring to the drawings, an automotive vehicle 1 is connected to a trailer 3 by a hitch 5. The hitch includes a ball 7 mounted in a socket 13 on a bracket 9 secured to the automotive vehicle by screws 11 in the usual manner. Ball 7 and socket 13 may be of conventional construction as long as they permit the trailer to rotate about the yaw axis. A crank 15 has one end secured to ball 7 and the other end is secured to a torque arm 16 which is welded or otherwise fixed to a member 17 attached by brackets 19 to trailer 3. The torque arm is eccentric to the ball hitch so that when the trailer sways the hitch lateral force is transmitted through crank 15 to apply a torque to torque arm 16 and rotation of the torque arm about member 17 is proportional to the force applied.

The end of torque arm 16 remote from crank 15 is pivotally attached to a lever 21 connected to a brake modulator 23 mounted on a plate 24 secured to brackets 19. The modulator may comprise a variable resistance, inductance, capacitance or any other suitable means. Since rotation of torque arm 16 is proportional to the torque applied, lever 21 operates the modulator in proportion to the hitch lateral force. The modulator provides a d.c. voltage or current proportional to the hitch lateral force which controls the electrical brakes on the trailer as described hereinafter. If the trailer is equipped with hydraulic brakes the modulator may include a valve operated by lever 21. A trailer hitch for operating hydraulic surge brakes in response to hitch lateral force is shown and described in U.S. application Ser. No. 552,084 filed Feb. 24, 1975 and assigned to the same assignee as the present application.

Referring to FIG. 3, brake modulator 23 may comprise a variable resistor including resistor elements 43 and 45 separated by an insulator 47 and a wiper 41 connected to the positive terminal of the d.c. source through resistor 48. As the wiper 41 is moved from insulator 47 into contact with resistor element 43 or resistor element 45, depending upon the direction of the hitch lateral force, the brake modulator provides an electrical signal which is proportional to the magnitude of the hitch lateral force. Brake modulator 23 is connected by resistors 25 and 27 to the base electrodes of transistors 29 and 31, respectively. The manual brake actuator provides a brake signal B which is applied through resistors 33 and 35 to the base electrodes of transistors 29 and 31, respectively, also. The collectors of transistors 29 and 31 are connected to the positive terminal of the d.c. voltage source. The emitter of transistor 29 is connected to the left brake 37 and the emitter of transistor 31 is connected to the right brake 39 and both brakes are connected to ground.

As explained above, the signal from brake modulator 23 is proportional to hitch lateral force and the signal is summed with and modulates the brake signal B if the trailer tends to sway or swerve while the brakes are being applied manually. If the forces acting on the trailer are of sufficient magnitude to cause the trailer to sway, the hitch lateral force will reach a substantial value before the sway starts. Hitch lateral force toward the left causes the trailer to sway to the right (looking forwardly of the trailer) and wiper 41 is moved into contact with resistor element 43 providing a hitch lateral force signal which is summed with the brake signal and applied to the base of transistor 31 to operate the right brake 39 and increase the braking force on the right wheel of the trailer to provide a compensating moment on the trailer to avoid a dangerous condition. Similarly, hitch lateral forces toward the right cause the trailer to sway to the left and wiper 41 is moved into contact with resistor element 45 providing a hitch lateral force signal which is summed with the brake signal and applied to the base of transistor 29 to operate the left brake 37 and increase the braking force on the left wheel of the trailer to provide a compensating moment on the trailer to avoid a dangerous condition. The braking force is increased on the wheel at the side of the trailer in the direction of the impending sway.

If the combination vehicle is travelling at constant speed and the brakes are not being applied, hitch lateral forces toward the left provide an electrical signal for operating the right brake 39 and hitch lateral forces toward the right provide a signal for operating the left brake 37. The dead space between resistor elements 43 and 45 is selected so that the brake modulator operates the brakes above a predetermined hitch lateral force to avoid excessive brake application.

Figure 4:
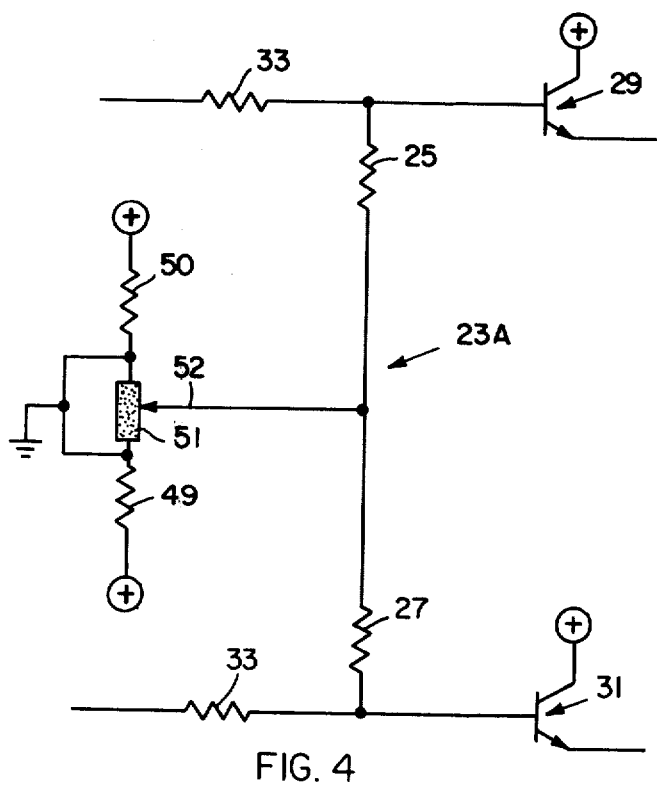

FIG. 4 shows a modulator 23a for applying right and left brakes simultaneously. A variable resistor has elements 49 and 50 separated by an insulator 51. One end of each resistor element 49 and 50 is connected to the positive D.C. source and the other end is connected to ground. When the hitch lateral force is above a predetermined minimum a wiper 52 contacts resistor 49 or 51, depending on the direction of the hitch lateral force, and provides an electric signal through resistor 25 to transistor 29 and through resistor 27 to transistor 31 for operating both brakes simultaneously.

A hitch constructed according to the invention improves the stability of a combination vehicle, making it easy to control and safe at high speeds because the trailer will not jack knife even under adverse conditions.

What is claimed is:

1. Apparatus for automatically eliminating a sway condition in a trailer vehicle towed by a tow vehicle and having brakes for retarding its rate of movement and having brake operating means with manual means for providing signals to the brake operating means for operating the brakes of the trailer vehicle, comprising a hitch connecting the trailer vehicle to the tow vehicle, sensing means on the hitch for providing signals corresponding to hitch lateral forces, and means connected to the sensing means and to the manual means for combining the hitch lateral force signals with the manual signals to increase the braking force on at least one wheel of the trailer vehicle for automatically eliminating a sway condition.

2. Apparatus for automatically eliminating a sway condition in a trailer vehicle as described in claim 1 in which the brake operating means increases the braking force on the wheel at the side of the trailer opposite to the direction of the hitch lateral force.

3. Apparatus for automatically eliminating a sway condition in a trailer vehicle towed by a tow vehicle and having brakes for retarding its rate of movement and having brake operating means for operating the brakes of the trailer vehicle, comprising a hitch including a ball member and a socket member connecting the trailer vehicle to the tow vehicle, sensing means on the hitch for providing signals corresponding to hitch lateral forces including a crank connected to one of the members, a torque arm secured to the crank, and a signal device operated by the torque arm and connected to the brake operating means, the crank being arranged to transmit hitch lateral forces to the torque arm for operating the signal device to provide signals to the brake operating means for operating the tow vehicle brakes to automatically eliminate a sway condition.

* * * * *